United States Patent
Pathangay et al.

(10) Patent No.: US 10,041,673 B2
(45) Date of Patent: Aug. 7, 2018

(54) FLARE STACK MONITORING

(71) Applicant: Honeywell International Inc., Morristown, NJ (US)

(72) Inventors: Vinod Pathangay, Bangalore (IN); Mahesh Kumar Gellaboina, Kurnool (IN); Mohammed Ibrahim Mohideen, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 1199 days.

(21) Appl. No.: 13/951,235

(22) Filed: Jul. 25, 2013

(65) Prior Publication Data

US 2015/0030987 A1   Jan. 29, 2015

(51) Int. Cl.
| | |
|---|---|
| F23N 5/24 | (2006.01) |
| F23G 7/08 | (2006.01) |
| G06T 7/00 | (2017.01) |
| G06T 7/269 | (2017.01) |

(52) U.S. Cl.
CPC ............ *F23N 5/242* (2013.01); *F23G 7/085* (2013.01); *G06T 7/0002* (2013.01); *G06T 7/269* (2017.01); *G06T 2207/10016* (2013.01); *G06T 2207/10048* (2013.01); *G06T 2207/20081* (2013.01)

(58) Field of Classification Search
CPC ...... G06T 7/0002; G06T 7/2066; F23N 5/242
USPC ........................................... 431/13; 382/107
See application file for complete search history.

(56) References Cited

U.S. PATENT DOCUMENTS

| | | | |
|---|---|---|---|
| 4,871,307 A | 10/1989 | Harris | |
| 5,225,810 A * | 7/1993 | Inoue | G08B 17/103 |
| | | | 250/574 |
| 5,302,113 A | 4/1994 | Eichelberger | |
| 5,957,681 A | 9/1999 | Hansen | |
| H001925 H | 12/2000 | Stellman | |
| 7,068,808 B1 * | 6/2006 | Prokoski | F42B 35/00 |
| | | | 382/100 |
| 7,983,445 B2 * | 7/2011 | Knox | G01N 21/53 |
| | | | 382/103 |
| 2001/0014436 A1 * | 8/2001 | Lemelson | F23N 1/022 |
| | | | 431/12 |
| 2010/0073477 A1 * | 3/2010 | Finn | G08B 17/125 |
| | | | 382/103 |
| 2012/0195462 A1 * | 8/2012 | Pu | G06T 7/408 |
| | | | 382/103 |

FOREIGN PATENT DOCUMENTS

| | | |
|---|---|---|
| EP | 1463789 B1 | 10/2004 |
| GB | 230247 | 3/1925 |

* cited by examiner

*Primary Examiner* — Avinash Savani
*Assistant Examiner* — Aaron Heyamoto

(57) ABSTRACT

Methods, systems, and computer-readable and executable instructions are described herein. One method includes receiving a sequence of images of a flare stack area from a thermal imaging component, identifying a first portion of the flare stack area moving at a first threshold optical flow using the sequence of images of the flare stack area, and identifying a second portion of the flare stack area moving at a second threshold optical flow using the sequence of images of the flare stack area.

14 Claims, 3 Drawing Sheets

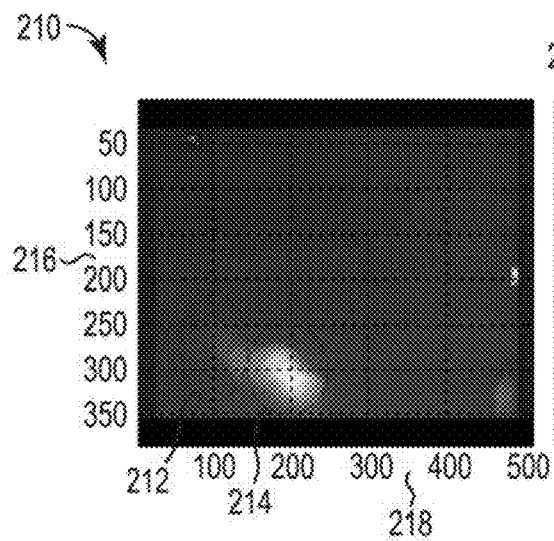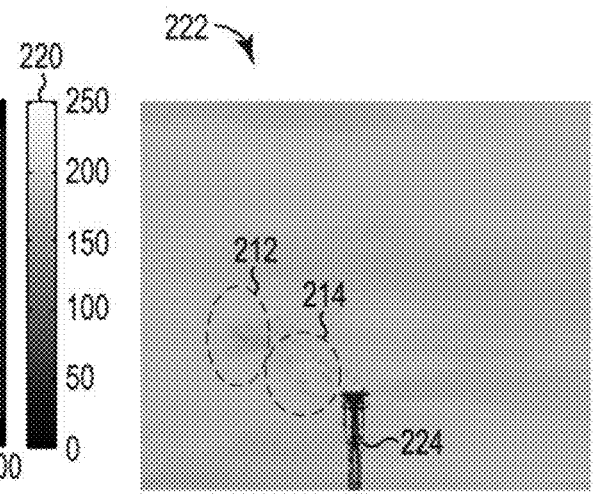
Fig. 2A
Fig. 2B
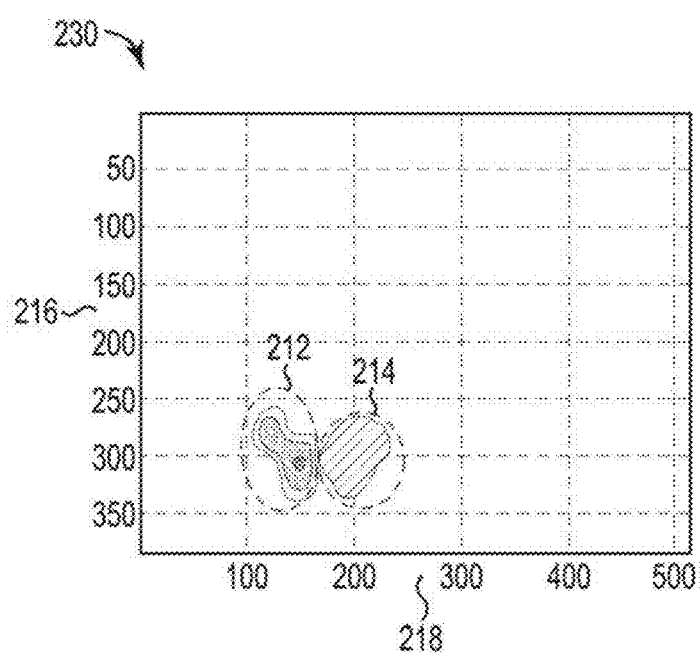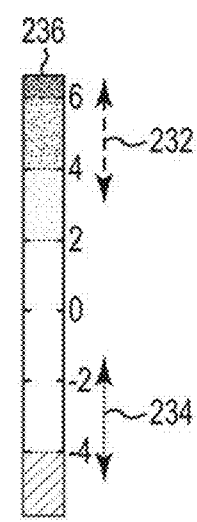
Fig. 2C

FLARE STACK MONITORING

TECHNICAL FIELD

The present disclosure relates to methods, systems, and computer-readable and executable instructions for flare stack monitoring.

BACKGROUND

A flare stack (sometimes called a gas flare or a flare) is an upwardly directed duct, open at its top end, for disposing of unwanted gases released from a facility, such as petrochemical plant, oil and gas processing fields, and/or other facilities. The released gases can be both flammable and environmentally damaging. To prevent and/or minimize the gases from escaping into the atmosphere, the gases can be burned before they are discharged near the top end of the flare stack. A pilot burner is located near the top of the flare stack, to ignite the released gases.

An entity may want to determine that gases are being properly burned by the flare stack. In some instances, a government entity (e.g., Environmental Protection Agency) can mandate that an entity monitor the combustion process and ensure that gases released into the atmosphere are at an admissible level. To ensure that the gases are being burned and not released into the atmosphere as an environmentally damaging gas, the flare stack can be monitored to detect when the flare stack is burning gases (e.g., by identifying a flame near the top of the flare stack).

One flare stack monitoring method is visual based inspection. Another method is based on optical camera monitoring. Both require manual operation by a trained operator. Further, an image captured by an optical camera (e.g., a red green blue image) cannot capture images of the flare stack at night and/or at degraded weather conditions.

BRIEF DESCRIPTION OF THE DRAWINGS

FIG. 2A illustrates an image of a flare stack area captured using a thermal imaging component in accordance with one or more embodiments of the present disclosure.

FIG. 2B illustrates an image of a flare stack area captured using an optical imaging component in accordance with one or more embodiments of the present disclosure.

FIG. 2C illustrates a processed image of a flare stack area in accordance with one or more embodiments of the present disclosure.

DETAILED DESCRIPTION

Figure 1:
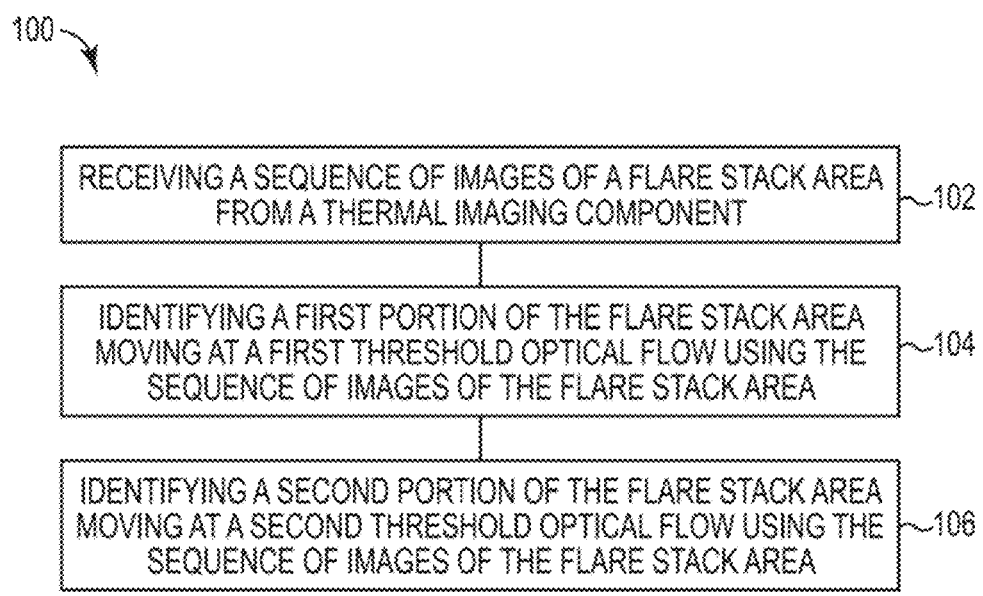
FIG. 1 illustrates an example of a method for flare stack monitoring in accordance with one or more embodiments of the present disclosure.

Methods, systems, and computer-readable and executable instructions for flare stack monitoring are described herein. For example, one or more embodiments can include receiving a sequence of images of a flare stack area from a thermal imaging component, identifying a first portion of the flare stack area at a first threshold optical flow using the sequence of images of the flare stack area, and identifying a second portion of the flare stack area moving at a second threshold optical flow using the sequence of images of the flare stack area.

An operator can monitor a flare stack and a combustion process by observing the flare stack and tracking flare activity. Previous approaches to flare stack monitoring can include physically watching the flare stack and/or observing images captured of the flare stack by an optical imaging component. However, in either instance, the operator may have to perform manual actions in a system associated with the flare stack to identify and/or record the flare activity. Further, an optical imaging component may capture images at night (e.g., low light and/or no light) that are difficult to interpret. Recently, some federal and state authorities across the world have mandated recording of video images as evidence of compliance with various laws and ordinances. Hence, it is important to record quality images from which inference of emissions can be made.

In contrast, embodiments of the present disclosure include flare stack monitoring methods, systems, and computer-readable and executable instructions that improve user efficiency and reduce manual action as compared to previous approaches. Flare stack monitoring, in accordance with one or more embodiments, can include processing thermal images captured of a flare stack area (e.g., an image of the flare stack and air space near the flare stack). The thermal images captured can be used, in various embodiments, to train a system to identify flare portions and smoke portions of the images based on the rate of movement of portions between a sequence of images. For instance, smoke particles can move faster than flare/flame particles. This is because smoke particles are less dense than particles that are on fire. Further, the thermal images can capture the flare stack activity in low lighting and/or reduced visibility, unlike an optical image.

In some embodiments, the processing of the images can include outputting an image with visual identification of flare portions and/or smoke portions in each image. For instance, a visual color differentiation can be applied to a flare portion and a smoke portion of the images. Example color differentiation can include a scale range of colors based on an identified movement of each portion and/or based on thermal intensity identified in the images.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" refers to one or more. For example, "a number of objects" can refer to one or more objects. Additionally, the designator "N" as used herein, particularly with respect to reference numerals in the drawings, indicate that a number of the particular features so designed can be included with a number of embodiments of the present disclosure.

FIG. 1 illustrates an example of a method 100 for flare stack monitoring in accordance with one or more embodiments of the present disclosure. The method 100 can be used to identify portions of a flare stack area as a flare portion and/or a smoke portion. A flare stack area, as used herein, can include an area including the flare stack and/or air (e.g., space) near the top of the flare stack area. In other words, the flare stack area can include an area where output material of the flare stack may travel to and/or through.

At block 102, the method 100 can include receiving a sequence of images of a flare stack area from a thermal imaging component. The sequence can include a number of images taken in a sequence of time (e.g., each image is taken at a predetermined periodic period of time). For instance, the sequence can include a first image taken at a first period of time and a second image taken at a second period of time. Although embodiments in accordance with present disclosure are not so limited and include more than two images in a sequence.

A thermal imaging component, as used herein, can include a device that captures (e.g., forms) images using electromagnetic radiation (e.g., infrared radiation). The thermal imaging component utilized to capture the images can be any suitable image sensor or camera device. In some embodiments, a thermal imaging component can be a thermal video camera and video analytics can be performed on the captured images. An example thermal imaging component can include a thermo graphic camera and/or video device, and/or an infrared (IR) camera and/or video device, among other components.

The thermal imaging component can be installed at a known location and perspective angle. That is, the field of view of the thermal imaging component can be known. A field of view of an imaging component, as used herein, can include an observable view of the imaging component at a particular position (e.g., an area that can be captured by a thermal imaging component at a particular position). In addition, parameters (e.g., such as intrinsic settings) of the thermal imaging component can be known. The location, perspective angle, and/or intrinsic settings of the thermal imaging component can be stored in memory and used for processing of images captured using the thermal imaging component (e.g., as discussed further herein).

At block 104, the method 100 can include identifying a first portion of the flare stack area moving at a first threshold optical flow using the sequence of images of the flare stack area. The first portion can include a smoke portion of the flare stack area, for instance. A threshold optical flow, as used herein, can include a rate of movement (e.g., a speed) of a portion of a flare stack area between images in the sequence of images. Identifying a portion moving at a threshold optical flow, as used herein, can include identifying the portion is moving within the threshold optical flow (e.g., with a range of flow values).

At block 106, the method 100 can include identifying a second portion of the flare stack area moving at a second threshold optical flow using the sequence of images of the flare stack area. The second portion can include a flare portion of the flare stack area, for example. The second threshold optical flow can be less than the first threshold optical flow (e.g., the first threshold is greater than the second threshold).

The identification of the first portion and the second portion, as used herein, can occur in an automatic fashion, such as without human intervention, by a computing system processing the sequence of images. For instance, the first portion and the second portion can be identified by calculating a dense optical flow (e.g., of portions of the sequence of images) between each image of the sequence of images. The identification can be based on a calculated distance between a portion (e.g., first portion or second portion) in a first image and the portion in a second image. The distances can include a two-dimensional distance (e.g., change in pixel x and change in pixel y between two or more images), for example. The identification can be made using a computing system, for instance (e.g., as discussed further herein).

In some instances, the calculated dense optical flow can be used to output a segmented image. For instance, using the dense optical flow, the identified first portion and the identified second portion can be segmented in each image of the sequence of images. The segmentation, as used herein, can include a visual indication (e.g., color indication, range of color, and/or shades of a color), as discussed further herein. A color can include, for instance, a black and white scale, in various embodiments. The segmentation of the image can be perfume in an automated fashion by a computing system.

In accordance with some embodiments of the present disclosure, the images captured can have a temperature-intensity map applied to each image. Using the temperature-intensity map, a foreground and a background of the images can be separated (e.g., as discussed further herein). Thereby, the resulting images can consist of flare and smoke pixels.

The first threshold optical flow and the second threshold optical flow can, in various embodiments, be identified using historical images of the flare stack area captured using the thermal imaging component. For instance, historical images and manual (e.g., human) identification of a first portion and a second portion can be received at a computing system. The computing system can use the inputs of the images and known outputs (e.g., identification of a first portion and a second portion) to identify the first threshold optical flow and the second threshold optical flow (e.g., as discussed further herein). In such an instance, the identification can include a learning-based approach for smoke/flare classification. The learning can be based on a ground-truth rule of flare and smoke (e.g., smoke particles move faster than fire particles). The identification can be used, for instance, for future automated processing of images of the flare stack area (e.g., identification of a first portion and a second portion without and/or with minimal human intervention).

In some embodiments, a sequence of the flare stack area can be received from an optical imaging component. An optical imaging component, as used herein, can include a device that can capture (e.g., form) images using light of the visible spectrum (e.g., portion of the electromagnetic spectrum that is visible by the human eye, such as red, green, and blue). The sequence of images captured using the thermal imaging component can be combined with the images captured using the optical imaging component. For instance, the combined images can be processed. Images captured by the optical imaging component can be received and/or processed during a threshold period of time. The threshold period of time can include a time that sufficient light and/or appropriate weather conditions are available to capture optical images. In various instances, the threshold period of time can include a dynamically changing period of time based on a variety of parameters. Example parameters can include weather parameters, such as sunset/sunrise times, cloud coverage, and/or rain patterns, among other parameters.

FIG. 2A illustrates an image 210 of a flare stack area captured using a thermal imaging component in accordance with one or more embodiments of the present disclosure.

The thermal imaging component can include an IR imaging component, for instance. The thermal imaging component can capture, for instance, a sequence of images. In various examples, the sequence of images can include static images (e.g., a static picture), video streams, and/or a combination of both.

As illustrated by the embodiment of FIG. 2A, the image 210 of the flare stack area captured using a thermal imaging component can have a temperature-intensity map (e.g., as illustrated by the grid of pixel y 216 to pixel x 218 intensity as mapped to the temperature range 220) applied to separate the foreground of the image from the background of the image. For instance, the temperature-intensity map can include a mapping of an intensity of a pixel of an image to a temperature output (e.g., the temperature range 220).

The temperature output can include intensity output, temperature, and/or radiance. That is, a temperature output can include an output associated with a setting (e.g., a calibration) of a thermal imaging component. Example settings of thermal imaging component can include intrinsic settings such as shutter speed and aperture, among other settings. Thereby, the image can have each pixel intensity (e.g., pixel y 216 by pixel x 218) mapped to a temperature range 220.

For instance, a thermal imaging component can be adjusted to operate at specific temperatures, in multiple specific temperature ranges, and/or with specific focus settings. The selection of at least one of the specific temperature, temperature ranges, and focus setting can be based on the location of the particular thermal imaging component. The selection of temperature ranges can be based on gases being burnt and the gases thermal characteristics, for instance.

As illustrated in FIG. 2A, the image 210 can include a first portion 212 and a second portion 214 of a flare stack area. The first portion 212 can include a smoke portion and the second portion 214 can include a flare portion, for instance.

FIG. 2B illustrates an image 222 of a flare stack area captured using an optical imaging component in accordance with one or more embodiments of the present disclosure. The image 222 can include an optical image. The image 222 can be captured and/or processed, in various embodiments, when sufficient light is available and/or appropriate weather conditions are occurring to capture an appropriate image 222. Weather parameters (e.g., sunrise/sunset, rain, cloud coverage) can be used to determine if the image 222 is to be captured and/or processed, in some instances.

The image 222 can be of a flare stack area. In some embodiments, the flare stack area can include the flare stack 224 and space near the flare stack 224. For instance, the flare stack area can include a first portion 212 and a second portion 214 of a flare stack area. The first portion 212 can include a smoke portion and the second portion 214 can include a flare portion, for instance.

FIG. 2C illustrates a processed image 230 of a flare stack area in accordance with one or more embodiments of the present disclosure. The processed image 230 can include a dense optical flow output on thermal image pixels. In some instances, the images can include a thermal video stream and the processed image 230 can include a dense optical flow output on pixels of frames of the thermal video stream.

The process image 230 can be based on the pixel-optical flow map, as illustrated in FIG. 2C. For instance, the processed image 230 can include a pixel by pixel (e.g., pixel y 216 by pixel x 218) mapped to an optical flow range 236 (e.g., a pixel mapped to optical flow).

The processed image 230 can include segmented identification of a first portion 212 and a second portion 214 of the flare stack area. The first portion 212 and the second portion 214 can be identified based on the first portion 212 moving at a first threshold optical flow and the second portion 214 moving at a second threshold optical flow between a sequence of images. An image sequence can include a temporal sequence of the flare stack area over a period of time. That is, the sequence of images captured during the period of time can consist of a plurality of images which are generated based on a user specified range of time. The sequence of images can include the images 210, 222 of the flare stack area illustrated in FIGS. 2A and/or 2B, in addition to one or more images captured by the thermal imaging component and/or the optical imaging component that captured images 210 and 222, respectively.

For instance, identifying the first portion 212 and the second portion 214 can include calculating a change in two-dimensional movement of portions of the flare stack area in the sequence images. For instance, the change in two-dimensional movement can include a change in x (e.g., pixel x 218) and a change in y (e.g., pixel y 216). Based on the two-dimensional movement, an optical flow of the portion (e.g., the first portion 212 and the second portion 214) can be calculated. The optical flow of each portion can be compared to an identified first threshold optical flow and to an identified second threshold optical flow to identify if the first portion 212 and second portion 214 are moving at either the first threshold optical flow or the second threshold optical flow. Both threshold optical flows, in various examples, can include a range of movement (e.g., speed).

For example, as illustrated in FIG. 2C, the first portion 212 can be identified as moving at a first threshold optical flow. The first threshold optical flow can be associated with smoke particles, therefore, the first portion 212 can include a smoke portion. The second portion 214 can be identified as moving at a second threshold optical flow. The second threshold optical flow can be associated with flare particles, therefore the second portion 214 can include a flare portion.

The identified first portion 212 and second portion 214 can be segmented. For instance, the segmentation can include a color indication (e.g., a first color to indicate smoke and a second color to indicate flare), a boundary indication (e.g., with color and/or geometric shapes), can include a range of colors (e.g., multiple colors and/or a black and white scale) and/or, as illustrated in FIG. 2C, can include lined/dotted indication, based on a combination of movement and thermal intensity (e.g., pixel level and/or a histogram).

For example, as illustrated in FIG. 2C, the first portion 212 can include a circular shaped dashed line identifying the boundary of the first portion 212 and can be in a range of line and/or dot densities (e.g., black lines and/or dots in varying densities) that corresponds to the optical flow range 236. The optical flow range 236 can have a range of lines and/or dot densities 232 that correspond and/or identify smoke portions in images. The second portion 214 can include a circular shaped dashed line identifying the boundary of the second portion 214 and can be in a range of line and/or dot densities that corresponds to the optical flow range 236. The optical flow range 236 can have a range of lines and/or dot densities 234 that correspond and/or identify flare portions in images.

In various embodiments, the first threshold optical flow and the second threshold optical flow can be identified using historical sequences of images. For instance, a sequence of images captured by a thermal imaging component can be received at a computing system (e.g., a computing component). An identification of a smoke portion and a flare portion of the received sequence of images can be provided (e.g., received from) by a user to the computing system. The user may identify the smoke portion and flare portion using manual methods, for instance. The user can include, for instance, an operator. Based on the received sequence of images (e.g., inputs) and the identified smoke portion and flare portion (e.g., expected outputs), the first threshold optical flow and the second threshold optical flow can be identified using the sequence of images and the received identification. In this manner, smoke/flare classification can be learned by the computing system.

In some instances, the learning-based approach can be used to identify a selective sub-area of the flare stack area captured in the images (e.g., image 230) to process based on two-dimensional locations (e.g., pixel y 216 by pixel x 218) of the first portion 212 (e.g., smoke portion) and the second portion 214 (e.g., flare portion). That is, a sub-area that smoke and/or flare may be located in (e.g., move to) can be learned based on historical sequences of images. The learned sub-area can be used to selectively process future images.

As an example, as illustrated in FIG. 2C, it may be identified using historical sequences of images that the first portion 212 and the second portion 214 do not move above the pixel y 50 and do not move to the right of the pixel x 400. Such lack of movement may be based on weather parameters (e.g., wind patterns) and/or other parameters. Future sequences of images can have a selective processing applied to the sub-area below pixel y 50 and to the left of pixel x 400. That is, a computing component system (e.g., a computing component) can be operated to selectively process a sub-area of each image based on the identification of the sub-area. Although embodiments in accordance with the present disclosure are not so limited and can include a variety of sub-areas and/or no selective processing.

The processed image 230 can be provided on a user interface. A user interface can, for example, include a space where interactions between a user and a computing system occur (e.g., allows a user to interact with a computing system using images and/or text). A user interface can include hardware components and computer instruction components. For instance, hardware components can include input components (e.g., a mouse, a touch screen, and a keyboard) and output components for the computing system to indicate the effects of user input (e.g., display). An example user interface can include a graphical user interface (GUI). A GUI can, for example, represent actions and tasks available to a user through graphical icons and visual indicators.

Figure 3:
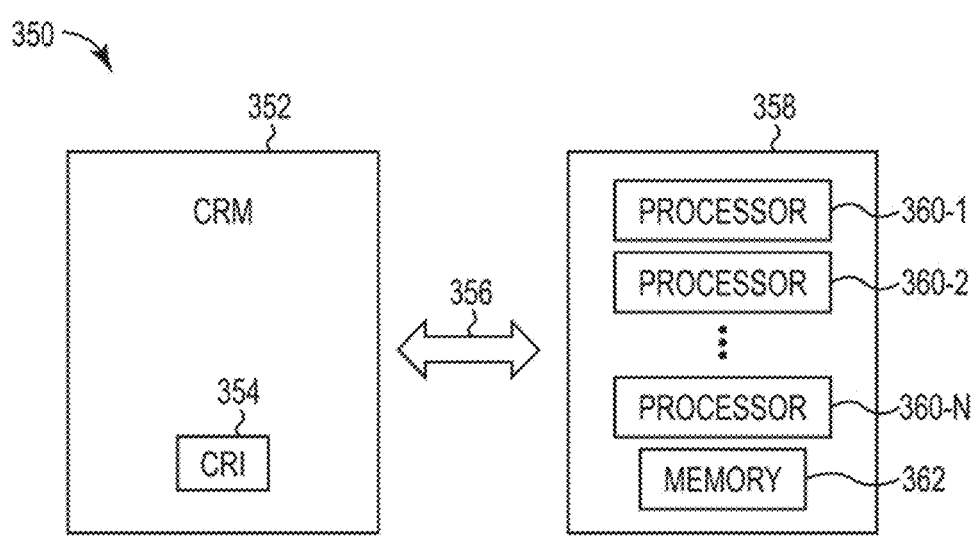
FIG. 3 illustrates a block diagram of an example of a system in accordance with one or more embodiments of the present disclosure.

FIG. 3 illustrates a block diagram of an example of a system 350 in accordance with one or more embodiments of the present disclosure. As shown in the embodiment of FIG. 3, the system 350 includes a computer-readable medium (CRM) 352 in communication with processing resources 360-1, 360-2 . . . 360-N.

CRM 352 can be in communication with a device 358 (e.g., a Java® application server, a mobile device, among others) having processing resources 360-1, 360-2 . . . 360-N. The device 358 can be in communication with a tangible non-transitory CRM 352 storing a set of computer-readable instructions (CRI) 354 executable by one or more of the processing resources 360-1, 360-2 . . . 360-N, as described herein. The CRI 354 can also be stored in remote memory managed by a server and represent an installation package that can be downloaded, installed, and executed. The device 358 can include the memory resource 362, and the processing resources 360-1, 360-2 . . . 360-N can be coupled to the memory resource 362.

Processing resources 360-1, 360-2 . . . 360-N can execute CRI 354 that can be stored on an internal or external non-transitory CRM 352. The processing resources 360-1, 360-2 . . . 360-N can execute CRI 354 to perform various functions. For example, the processing resources 360-1, 360-2 . . . 360-N can execute CRI 354 to separate a foreground of the image from a background of the image using a temperature-intensity map.

A non-transitory CRM (e.g., CRM 352), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 352 can also include distributed storage media. For example, the CRM 352 can be distributed among various locations.

The non-transitory CRM 352 can be integral, or communicatively coupled, to a computing device, in a wired and/or a wireless manner. For example, the non-transitory CRM 352 can be an internal memory, a portable memory, a portable disk, or a memory associated with another computing resource (e.g., enabling CRIs to be transferred and/or executed across a network such as the Internet).

The CRM 352 can be in communication with the processing resources 360-1, 360-2 . . . 360-N via a communication path 356. The communication path 356 can be local or remote to a machine (e.g., a computer) associated with the processing resources 360-1, 360-2 . . . 360-N. Examples of a local communication path 356 can include an electronic bus internal to a machine (e.g., a computer) where the CRM 352 is one of volatile, non-volatile, fixed, and/or removable storage medium in communication with the processing resources 360-1, 360-2 . . . 360-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 356 can be such that the CRM 352 is remote from the processing resources e.g., 360-1, 360-2 . . . 360-N such as in a network relationship between the CRM 352 and the processing resources (e.g., 360-1, 360-2 . . . 360-N). That is, the communication path 356 can be a network relationship. Examples of such a network relationship can include a local area network (LAN), wide area network (WAN), personal area network (PAN), and the Internet, among others. In such examples, the CRM 352 can be associated with a first computing device and the processing resources 360-1, 360-2 . . . 360-N can be associated with a second computing device (e.g., a Java® server, a mobile device, etc.). For example, a processing resource 360-1, 360-2 . . . 360-N can be in communication with a CRM 352, wherein the CRM 352 includes a set of instructions and wherein the processing resource 360-1, 360-2 . . . 360-N is designed to carry out the set of instructions to process each image in a sequence of images.

The system 350, in accordance with various embodiments, can include and/or be a portion of a flare stack monitoring system. For instance, a flare stack monitoring system can include a thermal imaging component, an optical imaging component, and a computing component.

The thermal imaging component can be operated to capture a sequence of thermal images of a flare stack area over a period of time. The thermal imaging component can communicate with the computing component. For instance, the communication can include a wireless and/or wired communication. Example communications can include captured images, outputs of the imaging device (e.g., temperature outputs), and/or parameters of the imaging device, among other information.

The optical imaging component can be operated to capture a sequence of optical images of the flare stack area over the period of time. The optical imaging component can communicate with the computing component. For instance, the communication can include a wireless and/or wired communication. Example communications can include captured images and/or parameters of the imaging device, among other information.

The computing component can be operated to receive and/or retrieve the sequence of thermal images and the sequence of optical images, among other functions described herein. For instance, processing resources 360-1, 360-2 . . . 360-N coupled to the memory resource 362 can process each of the images in the sequences (e.g., the sequence of thermal images and the sequence of optical images).

For instance, the processing resources 360-1, 360-2 . . . 360-N coupled to the memory resource 362 can, for each image, separate a foreground of the image from a background of the image using a temperature-intensity map. The temperature-intensity map can be associated with the imaging component (e.g., thermal imaging component or optical imaging component) that captured the image.

The processing resources 360-1, 360-2 . . . 360-N coupled to the memory resource 362 can identify a smoke portion in the foreground of the image based on the smoke portion moving at a first threshold optical flow between the sequences of images. The identification can be based on a calculated dense optical flow of a portion of the image between the one and/or more of the images in the sequence, for instance. For example, each image can have an identified smoke portion in the foreground.

The processing resources 360-1, 360-2 . . . 360-N coupled to the memory resource 362 can identify a flare portion of the foreground of the image based on the flare portion moving at a second threshold optical flow between the sequences of images. The identification can be based on a calculated dense optical flow of a portion of the image between the one and/or more of the images in the sequence, for instance. For example, each image can have an identified flare portion in the foreground.

The processing resources 360-1, 360-2 . . . 360-N coupled to the memory resource 362 can segment the identified smoke portion and the identified flare portion of the image. The segmentation can include a visual indication. The segmentation can be based on, in some instances, an optical flow range (e.g., as illustrated in the embodiment of FIG. 2C). For instance, the visual indication can include drawn boundaries between pixels in the image that are identified as the smoke portion and identified as the flare portion. Example boundaries drawn can include a geometric indication (e.g., circle, rectangle, oval, and/or other geometric shape drawn around the portion) and/or color indication (e.g., different colors, a color range), among other boundaries. In various instances, each image can be segmented.

In some embodiments, the flare stack monitoring system can include a display component. A display component of the flare stack monitoring system can be operated to display a processed image of the flare stack area. The processed image can include an image with the segmented identified smoke portion and identified flare portion.

In various embodiments of the present disclosure, the processing resources 360-1, 360-2 . . . 360-N coupled to the memory resource 362 can utilize the sequence of thermal images of the flare stack area wherein the period of time is during a first threshold period of time and utilize the sequence of thermal images and the sequence of optical images of the flare stack area wherein the period of time is during a second threshold period of time. The first threshold period of time and second threshold period of time can be based on, for instance, weather patterns (e.g., sunrise/sunset times, cloud coverage, rain patterns).

Any of the above information, data, and/or images can be saved along with the plurality of images as metadata and/or a data file which can be available for later image processing and/or other purposes.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for flare monitoring, comprising:
   receiving a sequence of images of a flare stack area from a thermal imaging component;

identifying a first portion of the flare stack area moving in two dimensions at an identified first threshold optical flow using the sequence of images of the flare stack area, wherein the identified first threshold optical flow corresponds to a smoke portion of the flare stack area;

identifying a second portion of the flare stack area moving in two dimensions at an identified second threshold optical flow using the sequence of images of the flare stack area, wherein the identified second threshold optical flow corresponds to a flare portion of the flare stack area; and segmenting a second image of the flare stack area to differentiate both the first and second portions of the flare stack area from non-smoke and non-flare elements of the image of the flare stack area.

2. The method of claim 1, including:
applying a temperature-intensity map to the sequence of images; and
separating a foreground of the sequence of images from a background of the sequence of images using the temperature-intensity map.

3. The method of claim 1, wherein the first threshold optical flow is greater than the second threshold optical flow.

4. The method of claim 1, including identifying the first threshold optical flow and the second threshold optical flow utilizing historical images of the flare stack area from the thermal imaging component.

5. The method of claim 1, including receiving a sequence of images of the flare stack area from an optical imaging component, wherein the sequence of images from the optical imaging component are combined with the sequence of images from the thermal imaging component.

6. The method of claim 5, including receiving the sequence of optical imaging components during a threshold period of time, wherein the threshold period of time includes a dynamically changing period of time based on a number of parameters.

7. The method of claim 1, wherein:
the sequence of images includes a video stream; and
identifying the first portion and the second portion includes calculating a dense optical flow between frames of the video stream.

8. A non-transitory computer-readable medium storing instructions executable by a processing resource to:
receive a sequence of images of a flare stack area captured by a thermal imaging component;
receive a visual identification of a smoke portion and a flare portion of the sequence of images of the flare stack area;
identify an identified first threshold optical flow of smoke movement in two dimensions using the received sequence of images and the received visual identification of the smoke portion of the images of the flare stack area;
identify an identified second threshold optical flow of flare movement in two dimensions using the received sequence of images and the received visual identification of the flare portion of the images of the flare stack area; and
segment a second image of the flare stack area to differentiate both the first and second portions of the flare stack area from non-smoke and non-flare elements of the image of the flare stack area.

9. The medium of claim 8, wherein the instructions include instructions executable by the processing resource to identify a sub-area of the flare stack area of the sequence of images to process based on two-dimensional locations of the smoke portions and flare portions.

10. The medium of claim 8, wherein the instructions executable to identify the first threshold optical flow and the second threshold optical flow include instructions to draw boundaries between pixels in the sequence of images of the identified smoke portion and the identified flare portion.

11. The medium of claim 8, wherein the instructions executable to identify the first threshold optical flow and the second threshold optical flow include instructions to compute a distance between the flare portion and the smoke portion in each image of the sequence of images, wherein the distance includes a two-dimensional distance.

12. The medium of claim 11, wherein the instructions executable to identify the first threshold optical flow and the second threshold optical flow include instructions to base the identification on a ground-truth rule of flare and smoke, wherein the ground-truth rule of flare and smoke is smoke particles move faster than fire particles.

13. The medium of claim 8, wherein the instructions include instructions executable by the processing resource to determine a temperature to intensity map associated with the thermal imaging component.

14. The medium of claim 13, wherein the instructions to determine the temperature to intensity map includes instructions executable to map pixel intensity to temperature output of the thermal imaging component.

* * * * *